Aug. 18, 1931.  G. G. KRUESI  1,820,004
AERIAL NAVIGATION SYSTEM AND METHOD
Filed June 12, 1928  3 Sheets-Sheet 1
FIG_1_
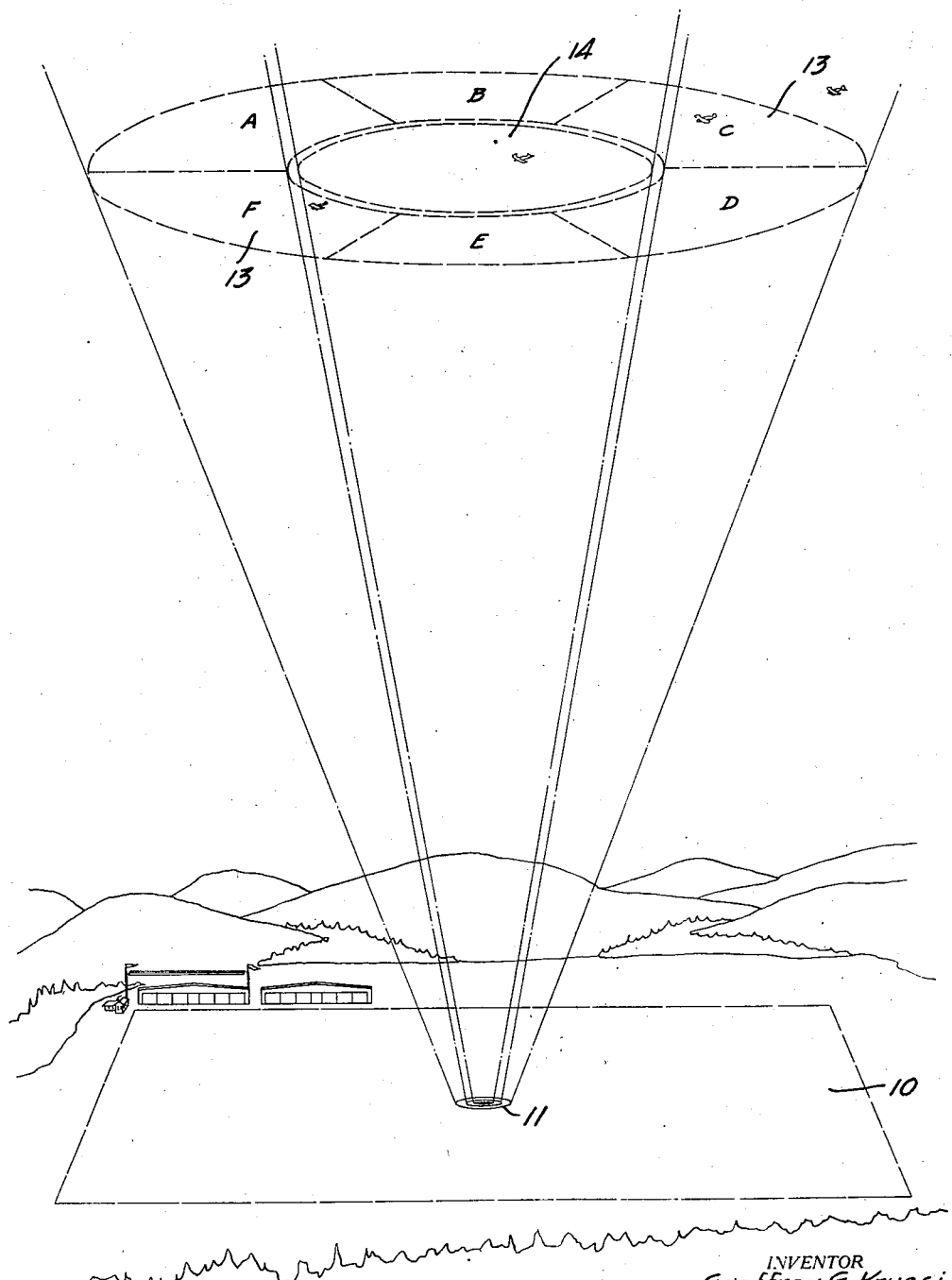
INVENTOR
Geoffrey G. Kruesi
BY
ATTORNEYS Aug. 18, 1931.         G. G. KRUESI              1,820,004
                AERIAL NAVIGATION SYSTEM AND METHOD
                    Filed June 12, 1928      3 Sheets-Sheet 2
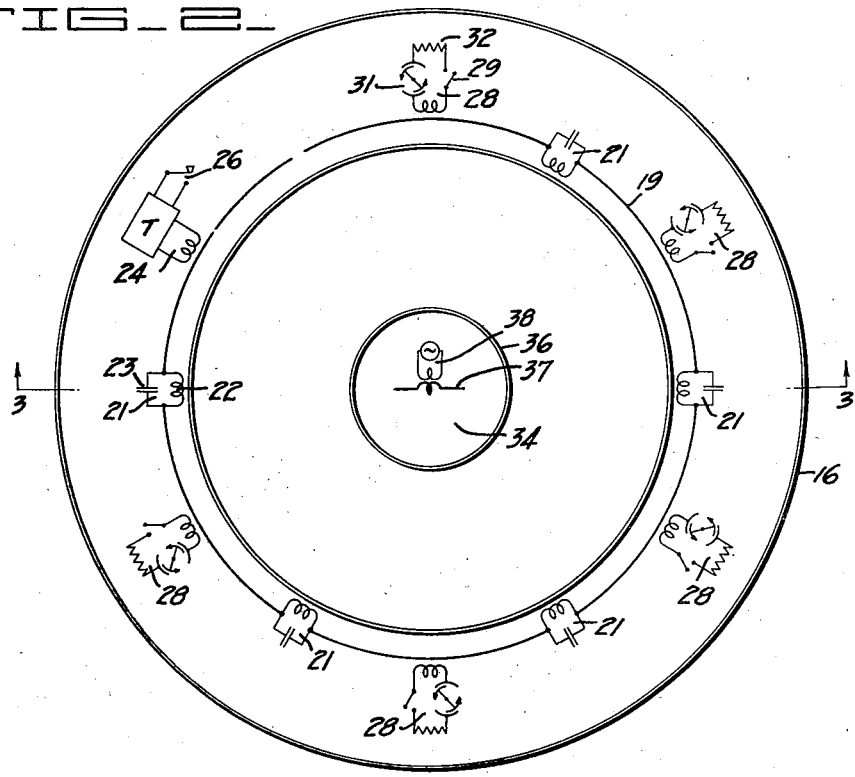
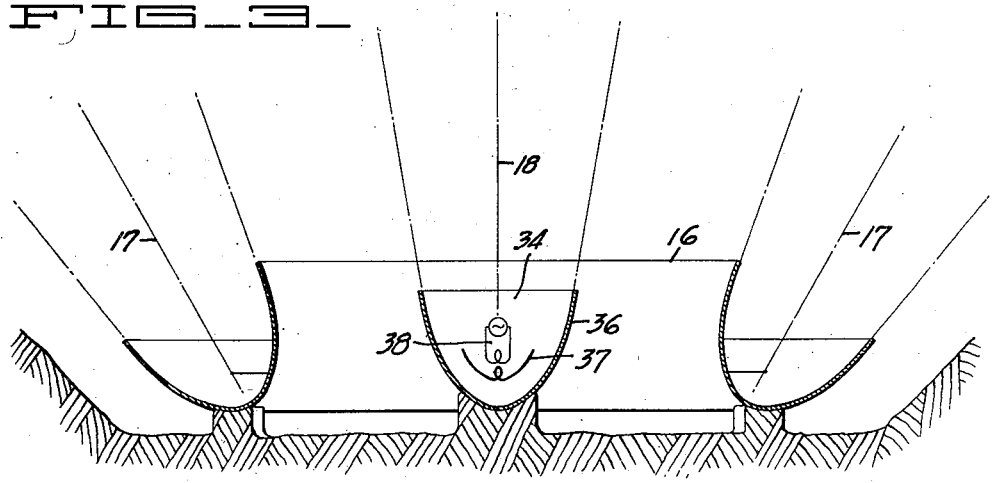
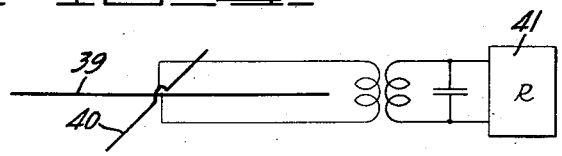

Aug. 18, 1931.  G. G. KRUESI  1,820,004
AERIAL NAVIGATION SYSTEM AND METHOD
Filed June 12, 1928   3 Sheets-Sheet 3
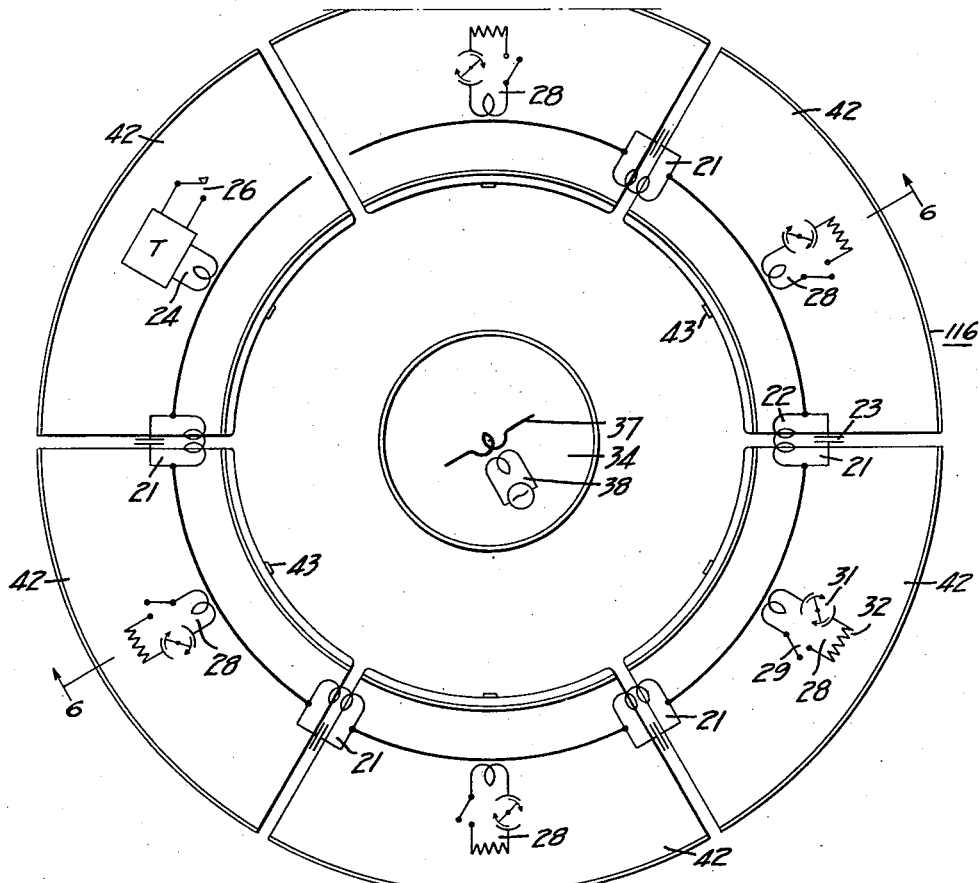
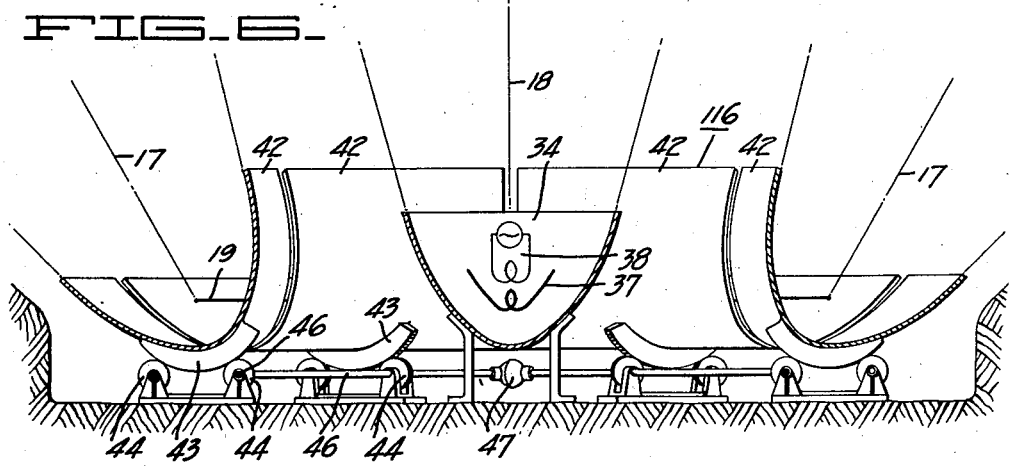
FIG_5_
FIG_6_
INVENTOR
Geoffrey G. Kruesi
BY
ATTORNEYS Patented Aug. 18, 1931

1,820,004

UNITED STATES PATENT OFFICE

GEOFFREY GOTTLIEB KRUESI, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

AERIAL NAVIGATION SYSTEM AND METHOD

Application filed June 12, 1928. Serial No. 284,864.

This invention relates to aerial navigation and has to do with a system and method of defining the location of a landing field, whereby aviators are enabled to land with relative safety when atmospheric conditions —particularly fog—diminish or destroy visibility.

The invention is characterized by a novel usage of directed radio beams whereby an aviator can ascertain, regardless of atmospheric conditions, when he is directly over a landing field, and thereby be enabled to land with considerable assurance of safety even though his vision may be completely obscured.

According to the present invention it is proposed to project upwardly from a landing field or the like an array of beams of electro-magnetic radiant energy so arranged and co-ordinated with respect to each other as to form in the space overlying the landing field an energized area which is divided into more or less geometrically arranged sections. Each of the sections is individually characterized in such a way that an aviator provided with the proper receiving equipment, upon flying through the energized area, is enabled to distinguish between the different sections by reason of their different characterizations and is thereby enabled to navigate his airship in such a way as to ensure a safe landing.

The invention will be described with reference to the accompanying drawings in which:

Fig. 1 illustrates a landing field equipped with beam projecting apparatus capable of producing above the field a plurality of co-ordinated beams.

Fig. 2 is a plan view of a radiant energy beam projector adapted for use in carrying out the present invention.

Fig. 3 is a cross-sectional view taken along line 3—3 of Fig. 2.

Fig. 4 is a schematic representation of a receiving antenna adapted to be carried on an aeroplane and designed to respond to differently polarized beams of radiant energy projected from the landing field.

Figs. 5 and 6 are views corresponding to Figs. 2 and 3 respectively, of a modified form of beam projecting apparatus.

In Fig. 1 there is shown a conventional landing field 10 equipped with suitable apparatus 11 for projecting electromagnetic waves. The field of radiation produced by apparatus 11 preferably consists of an outer concentrated zone 13, which substantially surrounds or circumscribes an inner space 14, space 14 extending upward from the landing field. Zone 13 is preferably symmetrical about a vertical axis and in effect is in the form of a hollow concentrated beam. The inner surface of this beam, which determines the space 14, preferably diverges, so that the area of space 14 increases for increasing distances from the ground.

Referring to Figs. 2 and 3, there is shown a wave reflector 16 which is made of conducting material such as copper mesh or copper sheeting. The surface of the reflector 16 preferably corresponds to a surface of revolution formed by a parabola revolved about an axis lying without the parabola. In Fig. 3 the axis of the parabola has been indicated at 17 and the axis about which the parabola is revolved is indicated at 18. It has been discovered that such a reflecting surface can be employed for the concentration of radio waves into a hollow beam symmetrical with respect to the axis 18. The dimensions of the radiated field depend upon the angle between axes 17 and 18 and for the purposes of the method of this invention, this angle should be sufficient to produce a divergent inner space.

As radiating means within the reflector it is preferred to employ an antenna conductor 19 extending substantially coincident with the focal line of the reflector. In this instance since the focal line is a circle, the conductor 19 is in the form of a ring. In order to reduce the diameter of the reflector and still permit the antenna conductor to be excited with energy of a reasonable wavelength, and for other reasons which will be presently apparent, conductor 19 is divided into a plurality of sections by means of reactive phase shifting means 21, each of which preferably consists of an inductance 22 shunted by a capacitance 23. In the particular form of the apparatus shown, the antenna conductor is divided into six different sections. Each conductor section is preferably made equal to substantially one-half wave-length of the energy being employed, altho they may be inductively loaded to further decrease their effective length.

By exciting such antenna means with current of proper frequency, and by adjustment of phase shifting means 21, a potential nodal point is caused to fall on the medial portion of each conductor section. The transmitting circuit 24 for exciting the antenna means, is preferably coupled to one of the sections of the antenna conductor at such a potential nodal point. Modulating means for the transmitting circuit 24 has been conventionally indicated by a key 26. The wave-length of the oscillatory energy employed is preferably equal to substantially four times the focal length of the reflector. For example if the focal length is one meter, it is desirable to employ a wave-length of four meters. Other wave lengths may be employed however provided the focal length is always an odd multiple of a quarter wave length.

When a sectional antenna conductor as described above is excited, the beam of radiation which is produced is the composite result of reflected radiation from the different conductor sections. If the current in one section of the antenna conductor is modulated, then a segmental portion of the radiation field will be likewise modulated. In accordance with this invention I modulate each of the conductor sections in a different way, in order to characterize segments of the radiation field. As an example of means for effecting such modulation, I have shown an absorption circuit 28 coupled to each of the conductor segments at its potential nodal point. Each such absorption circuit may consist of a key 29, a periodically variable condenser or reactance 31, and a resistance or other energy absorption element 32. By operating the key 29 of each energy absorption circuit 28, the energy radiated by each conductor section can be coded in a characteristic way. As an alternative method to such coding, the variable reactances 31 can be rotated at different periods in order to modulate the several sections at different tone or signal frequencies.

Referring again to Fig. 1, and assuming that the apparatus 11 includes the arrangement described with reference to Figs. 2 and 3, the outer zone of radiation 13 is divided into a plurality of segments, the number depending upon the number of separately modulated sections of antenna conductor 19. These sections have been lettered A, B, C, D, E and F. Assuming that they are each modulated characteristically, then an aviator entering the zone 13 can tell by the character of the modulations received, which portion of the radiation field he is entering. Thus by knowing the manner in which the different sections are modulated, and knowing the arrangement of the sections, a navigator can determine his approximate bearings immediately upon entering the zone 13. Once within the zone 13, he can descend in zone 14 to the landing field.

In carrying out the method of this invention it is preferred to also characterize the inner space 14 by another inner zone of electromagnetic radiation. Referring to Figs. 2 and 3, this inner zone may be conveniently formed by another reflecting apparatus 34, capable of propagating a solid beam of radiation within the hollow beam produced by the reflector 16. Apparatus similar to the apparatus 34 is described in the copending application filed in the name of Kolster and Kruesi, Ser. No. 279,244, which is owned by the assignee of this application. It may be briefly described as comprising a wave reflector 36 in the form of a paraboloid, having an antenna conductor 37 positioned adjacent its focal center. Conductor 37 is coupled to a suitable signaling circuit 38. It is preferred that radiation from apparatus 34 be characterized in some way so that it may be distinguished from the radiation of zone 13. For example this inner radiation can be modulated in a characteristic way, or it can be of a different carrier frequency.

It is evident that in making use of my method, an aeroplane should be equipped with a suitable means for receiving and translating the radiation from both zones 13 and 14. The receiving equipment should be capable of receiving waves polarized in any vertical plane. As an example of such an antenna, in Fig. 4 I have shown crossed horizontal antenna conductors 39 and 40 coupled at their medial portions to a suitable receiver 41.

In Figs. 5 and 6 there is shown an apparatus similar to that illustrated in Figs. 2 and 3, except that the angle of projection can be varied to vary the extent of the inner space 14. In this case the reflector 116 is constructed similar in form to the reflector 16 as shown in Figs. 2 and 3. However instead of being continuous, it is divided into a plurality of sections 42 corresponding to the sections of the antenna conductor 19. By means of suitable apparatus, these reflector sections 42 can be tilted to various angles with respect to the central axis 18. As an example of such mechanism, I have shown each section 42 provided with an arcuate gear segment 43 engaging roller gears 44. Gears 44 are varied by suitable rotatable shaft sections 46, and these shaft sections are mechanically connected together by suitable flexible couplings 47. By rotation of the interconnected shaft sections 46, the reflector sections 42 can be simultaneously tipped to various angles with respect to the central axis 18. It is evident that in tipping the reflector sections 42, the theoretically correct geometric form of the reflectors cannot be maintained, but this form is maintained sufficiently for all practical purposes. Since it is convenient to keep the antenna conductor 19 and associated phase shifting means 21 relatively stationary for different adjustments of the reflector sections 42, these sections are preferably tipped about an axis which will cause the least amount of change in the relative positions of the antenna conductor 19 and the reflector sections. Control over the angle of propagation of the waves from the reflector 116 is desirable as it permits control of the extent of the inner space 14. Such control also makes possible a variation of the outer limits of zone 13 to suit varying flying conditions.

I claim:

1. In a radio system, a wave reflector, the shape of said reflector corresponding generally to a surface of revolution formed by a parabola revolved about a line which would intersect the axis of the parabola if the axis were extended, an antenna conductor positioned within the reflector and arranged to extend substantially coincident with respect to the focal line of the reflector, and phase shifting means interposed between portions of said conductor.

2. In a radio system, a wave reflector, the shape of said reflector corresponding generally to a surface of revolution formed by a parabola revolved about a line spaced with respect to the parabola, said reflector being divided into a plurality of sections, and antenna means positioned within said reflector.

3. In a radio system, a wave reflector, the shape of said reflector corresponding generally to a surface of revolution formed by a parabola revolved about a line spaced with respect to the parabola, said reflector being divided into a plurality of sections, antenna means positioned within said reflector, means for exciting said antenna, and means for separately modulating energy radiated from said sections.

4. In a radio system, a wave reflector, the shape of said reflector corresponding generally to a surface of revolution formed by a parabola revolved about a line spaced with respect to the parabola, and antenna means positioned within said reflector.

5. In a radio system, a wave reflector, the shape of said reflector corresponding generally to a surface of revolution formed by a parabola revolved about a line spaced with respect to the parabola, and antenna means positioned within said reflector and substantially coincident with the focal axis thereof.

6. In a radio system, a wave reflector formed as a surface of revolution and having a line focus, an antenna conductor positioned within said reflector at said focus, and phase shifting means interposed between portions of said conductor.

7. In a radio system, a wave reflector, the shape of said reflector corresponding generally to a surface of revolution formed by a parabola revolved about a line spaced with respect to the parabola, an elongated antenna conductor positioned within the reflector and extending practically coincident with the focus of the reflector, and reactive phase shifting means interposed between sections of said conductor.

8. In a radio system, a wave reflector, the shape of said reflector corresponding generally to a surface of revolution formed by a parabola revolved about a line spaced with respect to the parabola, an elongated antenna conductor positioned within the reflector and extending practically coincident with the focus of the reflector, reactive phase shifting means interposed between sections of said conductor, and means for separately modulating the energy of each conductor.

9. In a radio system, a wave reflector formed as a surface of revolution and having a circular focal line, and a circular shaped antenna conductor substantially coincident with said focal line.

In testimony whereof, I have hereunto set my hand.

GEOFFREY G. KRUESI.